(12) United States Patent
Chen

(10) Patent No.: US 10,183,725 B2
(45) Date of Patent: Jan. 22, 2019

(54) POWER DRIVING MOTOR FOR ELECTRIC BIKE

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Taoyuan (TW)

(*) Notice: Subject to any disclaimer, the term of this patent is extended or adjusted under 35 U.S.C. 154(b) by 29 days.

(21) Appl. No.: 15/415,310

(22) Filed: Jan. 25, 2017

(65) Prior Publication Data
US 2018/0208268 A1 Jul. 26, 2018

(51) Int. Cl.
| | |
|---|---|
| *B62M 6/55* | (2010.01) |
| *B62M 6/90* | (2010.01) |
| *H02K 7/08* | (2006.01) |
| *H02K 21/22* | (2006.01) |
| *H02K 7/14* | (2006.01) |

(52) U.S. Cl.
CPC ............... *B62M 6/55* (2013.01); *B62M 6/90* (2013.01); *H02K 7/083* (2013.01); *H02K 7/085* (2013.01); *H02K 7/14* (2013.01); *H02K 21/22* (2013.01); *H02K 2207/03* (2013.01)

(58) Field of Classification Search
CPC ......... B62M 6/55; B62M 6/90; H02K 1/2786; H02K 7/083
USPC .......................................................... 180/220
See application file for complete search history.

(56) References Cited

U.S. PATENT DOCUMENTS

| | | | |
|---|---|---|---|
| 6,629,574 B2* | 10/2003 | Turner | B62M 6/45 180/206.4 |
| 7,156,196 B2 | 1/2007 | Katsaros | |
| 9,035,504 B2* | 5/2015 | Furrer | H02K 1/2786 310/156.26 |
| 9,453,536 B2 | 9/2016 | Vogler et al. | |
| 2011/0259658 A1* | 10/2011 | Huang | B60K 1/04 180/65.51 |
| 2014/0199196 A1* | 7/2014 | Twardowski | E21B 33/14 418/1 |
| 2016/0303961 A1* | 10/2016 | Hendey | B62J 1/08 |

* cited by examiner

*Primary Examiner* — Jacob D Knutson
(74) *Attorney, Agent, or Firm* — Muncy, Geissler, Olds & Lowe, P.C.

(57) ABSTRACT

A power-driving motor for power-driving bike is provided, of which the length is obviously larger than its width. A rotor of the power-driving motor is provided at the outside of the stator so as to make the distance from the rotor to the motor spindle increase; namely, a torque increases and then an arm increases, thereby, making the motor spindle supply a higher output torque to the connected driving unit when the rotor rotates. The motor, based on the length of a conventional power-driving motor, may supply a higher output torque to solve the defect of a conventional motor implemented with an inner rotor of which the output torque is insufficient.

7 Claims, 7 Drawing Sheets

POWER DRIVING MOTOR FOR ELECTRIC BIKE

FIELD OF THE INVENTION

This invention relates to a power-driving motor and particularly to a power-driving motor for electric bike.

BACKGROUND OF THE INVENTION

Nowadays, a power-driving motor is generally implemented with a hub motor or an axis motor. The hub motor is as disclosed in U.S. Pat. Nos. 7,156,196 and 9,453,536. The hub motor is a flat-type motor large in diameter and small in width and is mainly fitted to a wheel to directly drive the wheel. Further, the axis motor is as disclosed in US patent No. 2016/0303961. The axis motor is mainly fitted to an axis position of a frame of the bike. When being implemented, the axis motor is needed to work with a gear box. However, practically, the hub motor and the axis motor are easily damaged and affect the appearance of power-driving bike, thereby lowering the whole design of the power-driving bike.

Nowadays, there are also some types of power-driving bikes, such as an assistant power-driving bike (Pedal-Assist Electric Bike), which includes a power-driving motor installed in a seat tube or down tube for keeping the design of the whole appearance of bike. However, the seat tube and down tube of the frame of the bike are not big in diameter, so the power-driving motor must be designed for its diameter complying with the diameter of the seat tube or down tube; namely, only the power-driving motor of small diameter may be implemented. Accordingly, the power-driving motor of equivalent length if being reduced in size affects the whole torque output of the power-driving motor and thus cannot supply enough power to the power-driving bike. Besides, although the length of the power-driving motor may be added, if the whole structure of power-driving motor is expanded in length, the weight and design cost of the power-driving motor are added, the design becomes difficult, and the operation efficiency is lowered, thereby the problems being not solved.

Consequently, because of the technical defects described above, to provide the rotary valve improver, the applicant, based on many years of research and experience in the relevant industry, has developed the present invention, which may effectively improve the defects described above.

SUMMARY OF THE INVENTION

This invention is mainly to solve the defect of a conventional small-diameter motor of which the output torque id insufficient.

To achieve the above object, this invention provides a power-driving motor for power-driving bike, comprising a housing, a stator, a motor spindle, and a rotor. The length of housing is obviously larger than the width of housing. The housing is hollow and formed with an accommodation space. The housing is provided with two side plates fitted opposite to each other on the accommodation space. One of the two side plates is provided with a mounting portion communicating with the accommodation space, and with a mounting holder opposite to the mounting portion. The stator is provided at a side of the mounting holder facing to the accommodation space. The motor spindle passes through the mounting portion and into the accommodation space. The motor spindle is further sleeved around and connected to two bearings fitted onto the two side plates. The rotor is provided in the accommodation space and includes a rotor support connected to the motor spindle, and is provided at the outside of the stator.

In an embodiment, the housing is a down tube of a bike frame.

In an embodiment, a clearance id formed between the motor spindle and the mounting holder. A second clearance is formed between the stator and the rotor. Further, a third clearance is formed between the rotor and the housing.

In addition to what is mentioned above, this invention provides another power-driving motor for power-driving bike, comprising a side plate, a stator, a motor spindle, and a rotor. The side plate is provided with a mounting portion and a mounting holder opposite to the mounting portion. The stator is provided at an outer portion of the mounting holder. The motor spindle passes through the mounting portion. The motor spindle includes a first section connected to the mounting portion, and a second section stretching from the first section. The diameter of the second section of the spindle is smaller than the first section. The first section is sleeved around and connected to a first bearing corresponding to the mounting portion; the second section is sleeved around and connected to at least one second bearing provided in the mounting holder. The rotor includes a rotor support connected to the second section of the motor spindle and is provided at the outside of the stator. The length of power-driving motor is obviously larger than the width of power-driving motor.

In an embodiment, the power-driving motor further includes a housing. The housing has an accommodation space. The side plate is provided corresponding to the housing so as to make the stator and rotor to be located in the accommodation space. Further, the housing may be a down tube of a bike frame.

In an embodiment, a clearance id formed between the motor spindle and the mounting holder. A second clearance is formed between the stator and the rotor. Further, a third clearance is formed between the rotor and the housing.

Being compared with the prior art, the motor from mentioned above in embodiments according to this invention has the following advantages. The power-driving motor according to this invention is implemented and designed for power-driving bike. The whole length of power-driving motor is larger than the whole width of power-driving motor so that the power-driving motor may be fitted in the down tube of the bike frame. Further, the rotor according to this invention is provided at the outside of the stator so as to make the distance from the rotor to the motor spindle increase; namely, a torque increases and then an arm increases, thereby, making the motor spindle supply a higher output torque to the connected driving unit when the rotor rotates; namely, the motor, based on the length of a conventional power-driving motor, may supply the higher output torque of 20%-50% up for solving the defect of a conventional small-diameter motor of which the output torque id insufficient.

The foregoing objectives and summary provide only a brief introduction to the present invention. Other objects, features, and advantages of the present invention will become conspicuous to those skilled in the art upon reading the following detailed descriptions accompanying by the illustrations.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In order to further know the features and technical means of this invention, refer to the detailed description according to this invention accompanied with drawings; however, the accompanied drawings are provided for reference and illustration only and are not limited to this invention.

Figure 1:
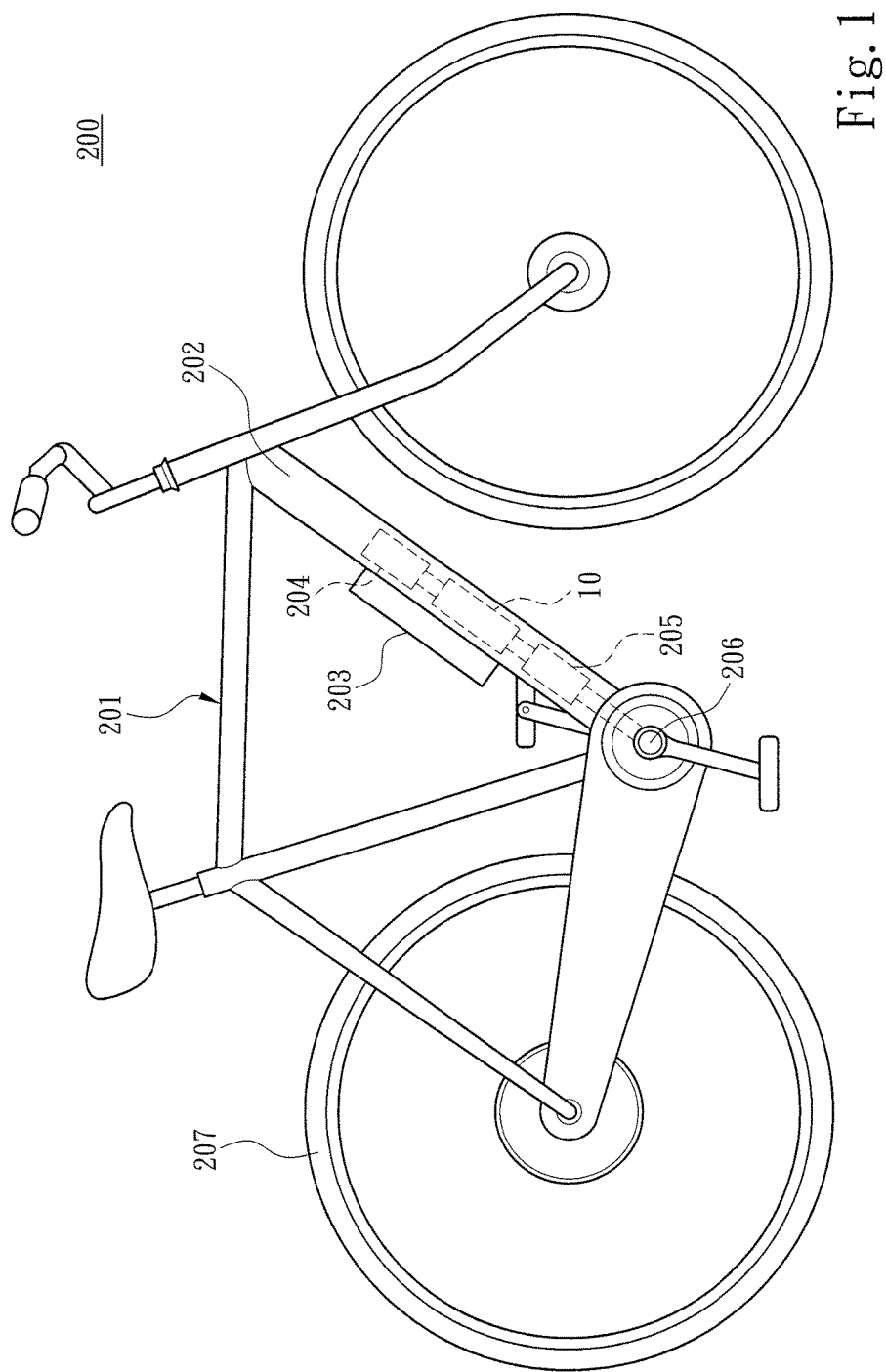
FIG. 1 is a schematic view illustrating the structure of a power-driving motor installed in a power-driving bike in an embodiment of this invention.
Figure 2:
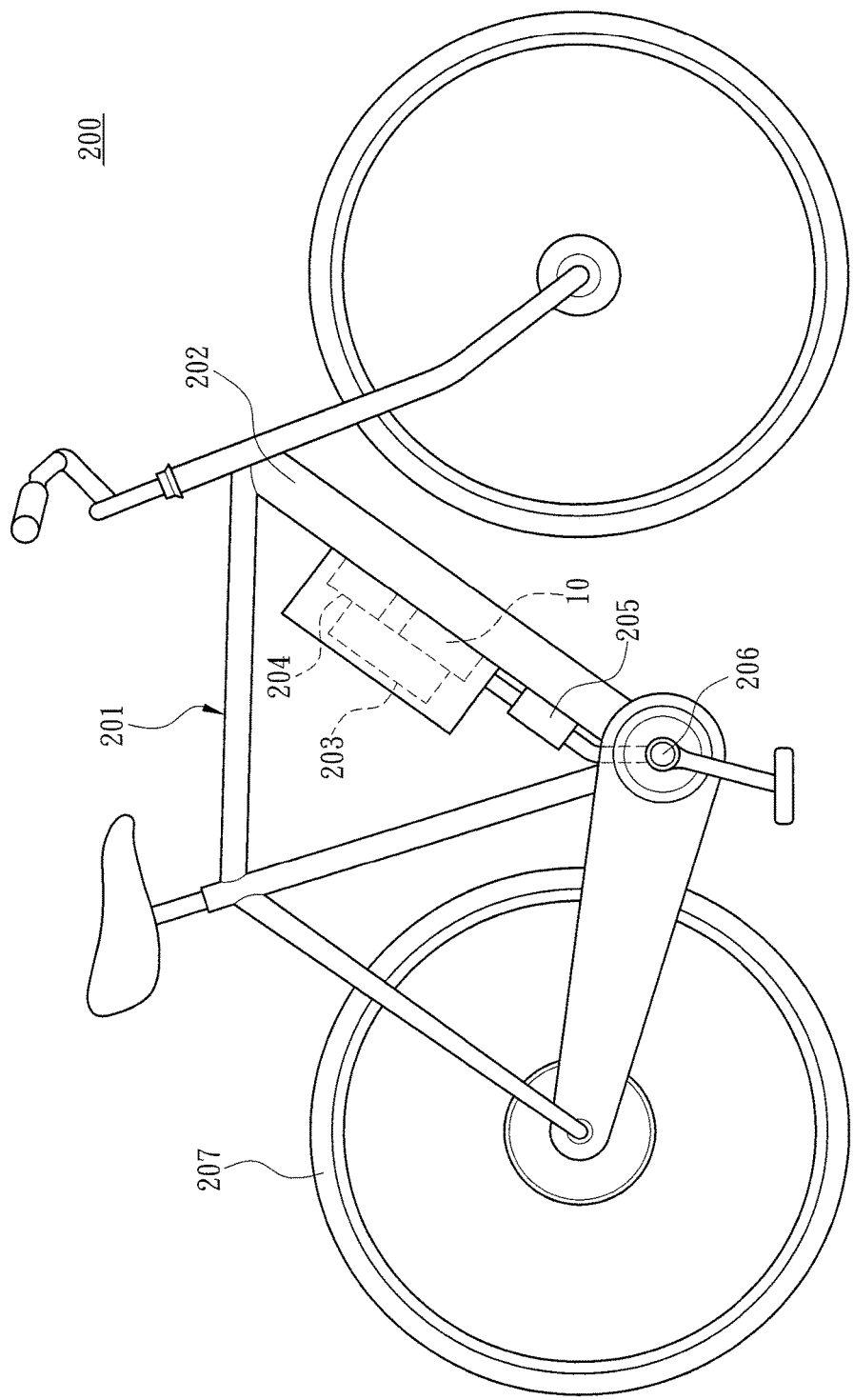
FIG. 2 is a schematic view illustrating the structure of a power-driving motor installed in a power-driving bike in another embodiment of this invention.

Refer to FIG. 1 through FIG. 4 illustrating a power-driving motor 10 for power-driving bike according to this invention. The power-driving motor 10, based on a requirement, may be fitted inside a bike frame 201 of the power-driving bike 200, as shown in FIG. 1, or outside the bike frame 201, as shown in FIG. 2. Further, the power-driving motor 10 may be fitted in a down tube 202 of the bike frame 201. The power-driving motor 10 may be designed for its outer diameter according to the bore of the down tube 202. Further, the power-driving motor 10 is powered by a battery 203. The working hours of the power-driving motor 10 depends on the electricity of the battery 203. Besides, the power-driving motor 10 is connected to a control module 204 from which the power-driving motor 10 receives a drive signal, and the power-driving motor 10 correspondingly rotates according to the generated drive signal, such as rotation speed increase or decrease. Further, the power-driving motor 10 is also connected to a driving unit 205. The driving unit 205 is driven by the power-driving motor 10 to drive a driving main shaft 206 to work. The driving main shaft 206 that works makes at least one wheel 207 of the power-driving bike 200 run, thereby making the power-driving bike 200 move. Besides, the driving unit 205 may be further a speed reduction mechanism. The driving unit 205 is implemented in various embodiments, which is not a point in this invention. It should be understood by those skilled in the art so that the present invention may be practiced without departing from the spirit and scope of the invention.

Figure 3:
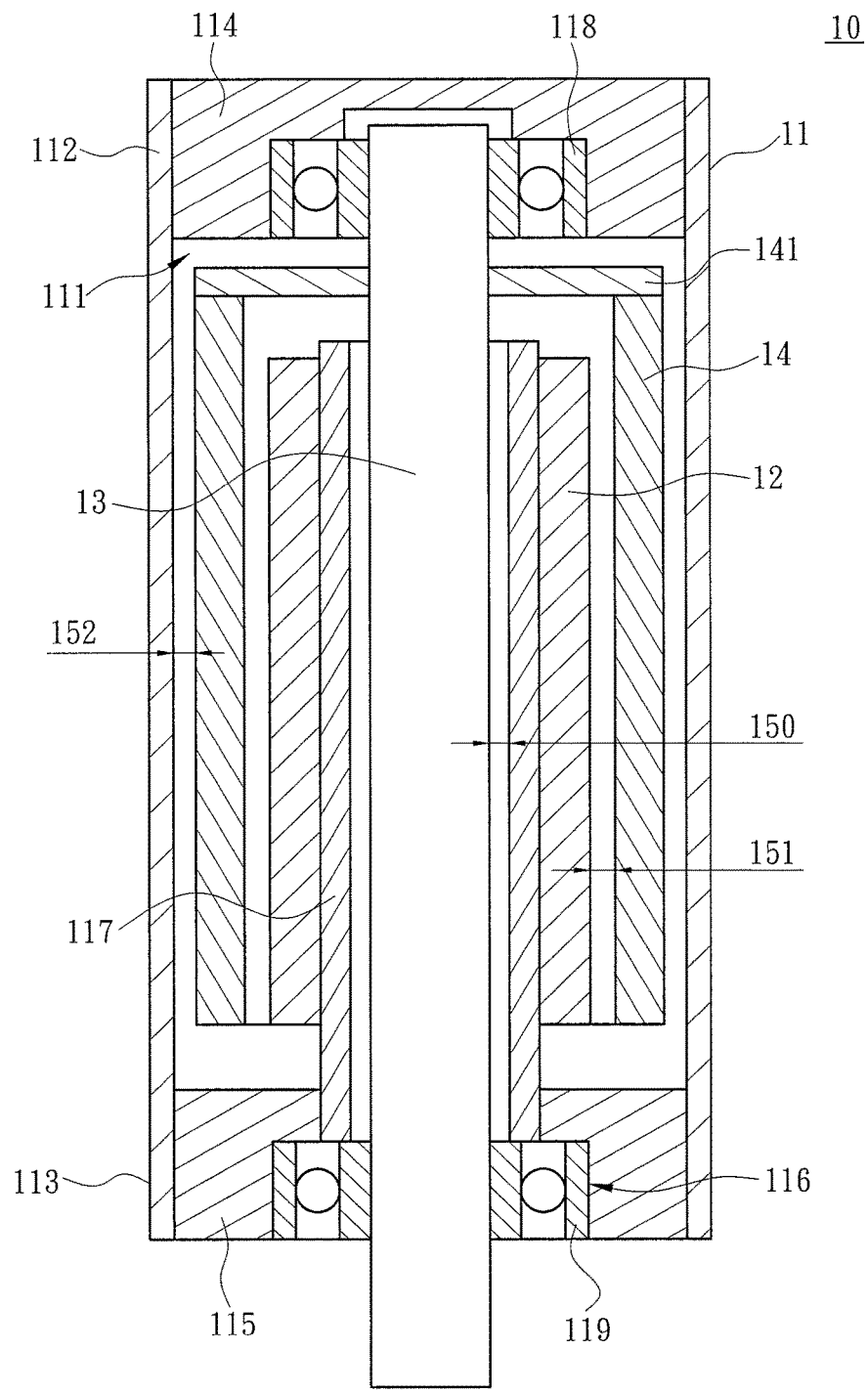
FIG. 3 is a schematic view illustrating the power-driving motor in an embodiment of this invention.
Figure 4:
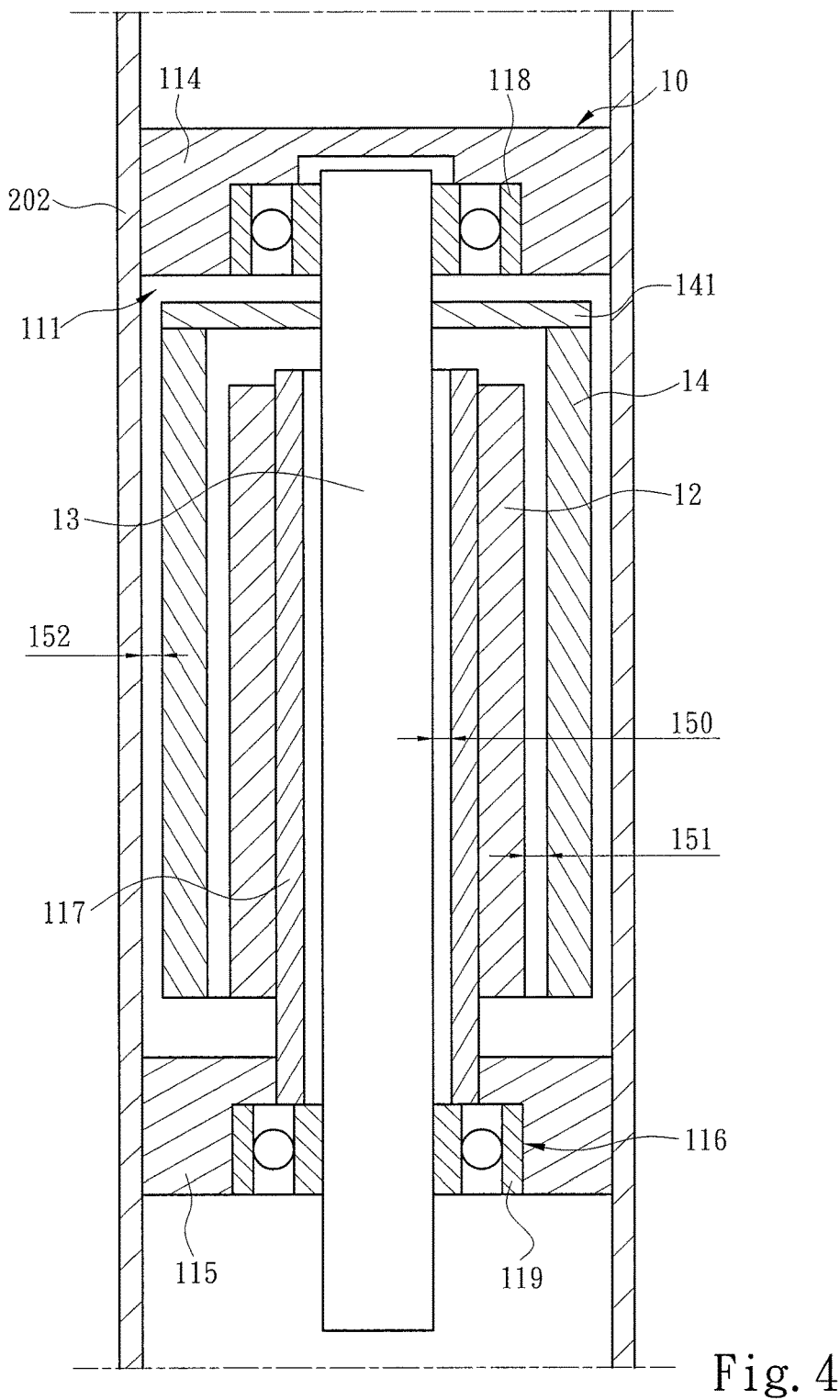
FIG. 4 is a schematic view illustrating the power-driving motor in another embodiment of this invention.

Apparently from the description mentioned above, the power-driving motor 10 comprises a housing 11, a stator 12, a motor spindle 13, and a rotor 14. In this invention, the housing 11 is a long tube; namely, the length of housing 11 is obviously larger than the width of housing 11. The housing 11 may be part of the down tube 202 of the bike frame 201 or a standalone member. Concretely, in this invention, the down tube 202 of the bike frame 201 may serve as the housing 11 and the related members are fitted in sequence into the down tube 202, as shown in FIG. 4. Alternatively, the housing 11 is a standalone member that serves as an individual part after the power-driving motor 10 is assembled so that the part may be fitted into the down tube 202 or attached onto the bike frame 201, as shown in FIG. 3. On the other hand, the housing 11 in this invention is hollow and formed with an accommodation space 111. The housing 11 is provided with two side plates 114 and 115 fitted on the opposite sides 112 and 113 of the accommodation space 111. One of the two side plates 114 and 115 is provided with a mounting portion 116 communicating with the accommodation space 111, and with a mounting holder 117 opposite to the mounting portion 116. Further, the mounting portion 116 may be a bearing slot formed with a thru hole.

And the stator 12 is provided at a side of the mounting holder 117 facing to the accommodation space 111. In this embodiment, the stator 12 may include a plurality of coil windings (not shown). The coil windings are set around the stator 12 at an even distance of intervals. Each of the coil windings is connected to the control module 204 to receive the drive signal from the control module 204 and then generate a magnetic force. Further, the motor spindle 13 may be correspondingly driven by the driving unit 205. The motor spindle 13 passes through the mounting portion 116 and into the accommodation space 111. The motor spindle 13 is further sleeved around and connected to two bearings 118 and 119 fitted separately onto the two side plates 114 and 115. Further, because being separately fitted with one of the side plate 114 or 115, the two bearings 118 and 119 are located at the opposite sides of the motor spindle 13. Being supported by the two bearings 118 and 119, the motor spindle 13 may stably work with respect to the housing 11.

Apparently from the description mentioned above, the rotor 14 is provided in the accommodation space 111 and includes a rotor support 141 connected to the motor spindle 13. The rotor 14 and the motor spindle 13 are interactive with each other. The rotor 14 may be fitted with a plurality of permanent magnets (not shown). The permanent magnets are set around the rotor 14 at an even distance of intervals. The permanent magnets and the powered coil windings generate a magnetic thrust to drive the rotor 14. The rotor 14 is provided at the outside of the stator 12; namely, in this invention, the structure of an outer rotor is implemented. Further, in this invention, a first clearance 150 is formed between the motor spindle 13 and the mounting holder 117 and a second clearance 151 is formed between the stator 12 and the rotor 14. Besides, a third clearance 152 is formed between the rotor 14 and the housing 11.

Apparently from the description mentioned above, compared with the prior art, in this invention, the distance from the rotor 14 to the motor spindle 13 is made to increase; namely, a torque increases and then an arm increases, thereby, making the motor spindle 13 supply a higher output torque to the connected driving unit 205 when the rotor 14 rotates; namely, the motor, based on the length of a conventional power-driving motor, may supply the higher output torque of 20%-50% up for solving the defect of a conventional motor implemented with an inner rotor of which the output torque is insufficient.

Figure 5:
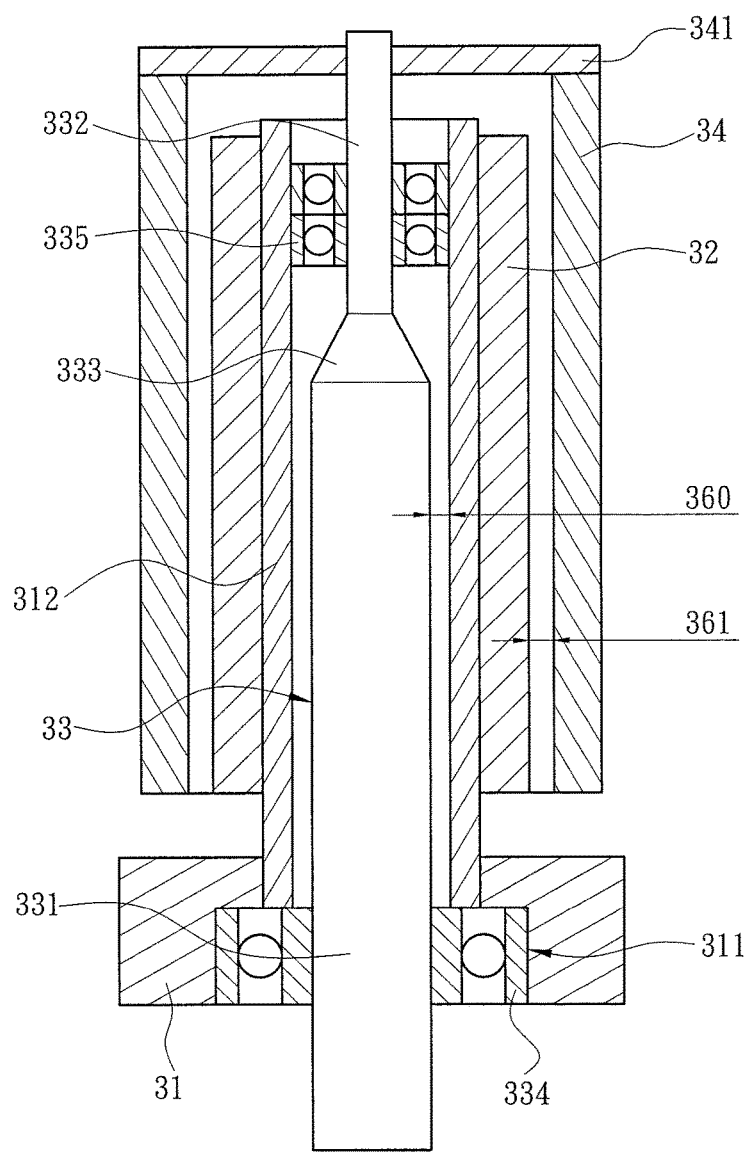
FIG. 5 is a schematic view illustrating the power-driving motor in another embodiment of this invention.

Refer to FIG. 5 illustrating another embodiment of this invention. In this embodiment, the power-driving motor 30 comprises a side plate 31, a stator 32, a motor spindle 33, and a rotor 34. The side plate 31 is provided with a mounting portion 311 and a mounting holder 312 opposite to the mounting portion 311. Further, the mounting portion 116 may be a bearing slot formed with a thru hole. The stator 32 is provided at an outer portion of the mounting holder 312. The manner of implementation of the stator 32 is the same as the previous embodiment, so no detailed description is made here. The motor spindle 33 passes through the mounting portion 311. The motor spindle 33 includes a first section 331 connected to the mounting portion 311, and a second section 332 stretching from the first section 331. The diameter of the second section 332 of the spindle is smaller than that of the first section 331; namely, in this embodiment, a diameter-variation portion 333 is formed between the first section 331 and second section 332 of the motor spindle 33. The diameter-variation portion 333 may be tapered, as shown in FIG. 5, or may be disconnected. Further, the first section 331 is sleeved around and connected to a first bearing 334 corresponding to the mounting portion 311. The second section 332 is sleeved around and connected to at least one second bearing 335 provided in the mounting holder 312. The first bearing 334 and the two second bearings 335 together support the motor spindle 33 for stable operation. Further, the rotor 34 includes a rotor support 341 connected to the second section 332 of the motor spindle 33 and is provided at the outside of the stator 32. The rotor 34 may be fitted with a plurality of permanent magnets (not shown). The permanent magnets are set around the rotor 34 at an even distance of intervals. The permanent magnets and the powered coil windings generate a magnetic thrust to drive the rotor 34. Further, in this embodiment, the length of power-driving motor 30 is obviously larger than the width of power-driving motor 30. In other words, the power-driving motor 30 according to this invention looks like a long tube as a hole. Thus, the distance from the rotor 34 to the motor spindle 33 is made to increase; namely, a torque increases and then an arm increases, thereby, making the motor spindle 33 supply a higher output torque to the connected driving unit 205 when the rotor 34 rotates; namely, the power-driving motor 30 may supply the higher output torque of 20%-50% up.

Figure 6:
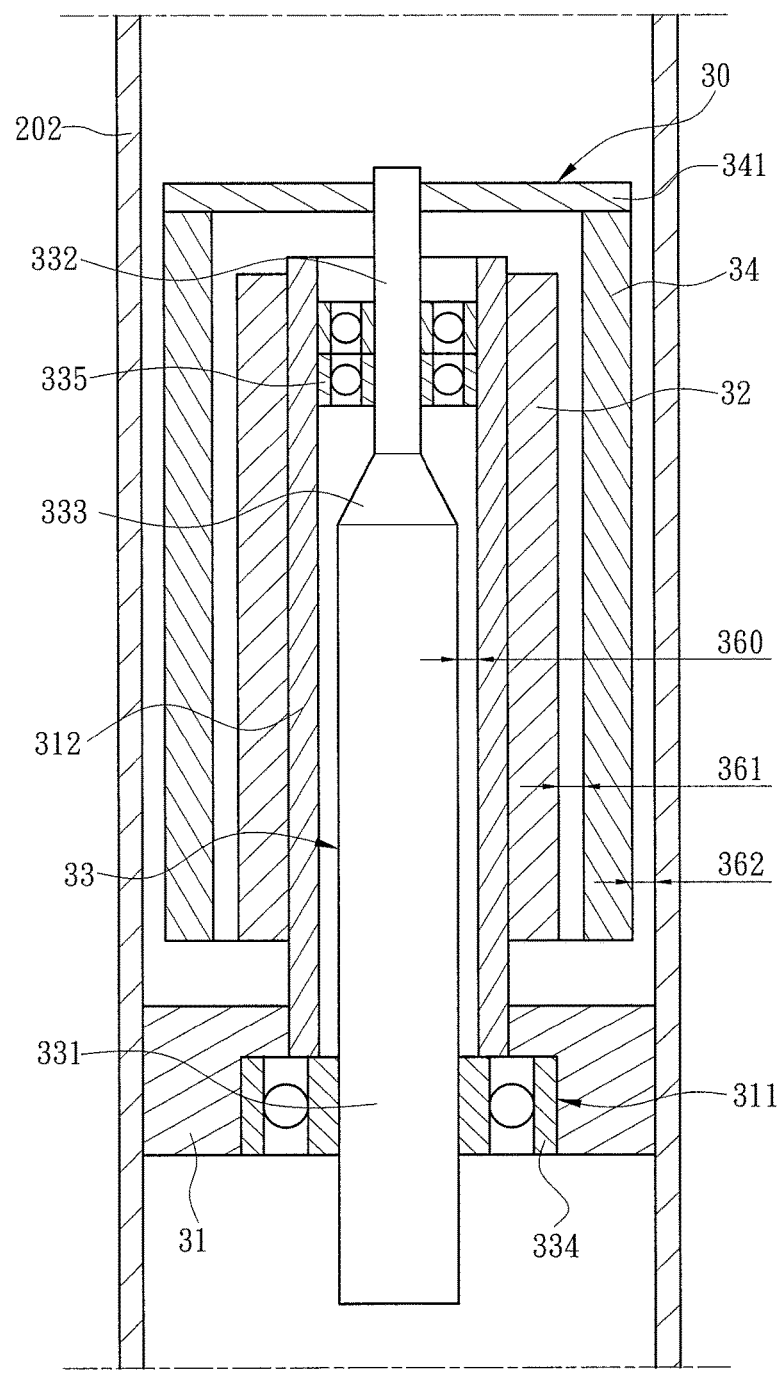
FIG. 6 is a schematic view illustrating the power-driving motor in another embodiment of this invention.
Figure 7:
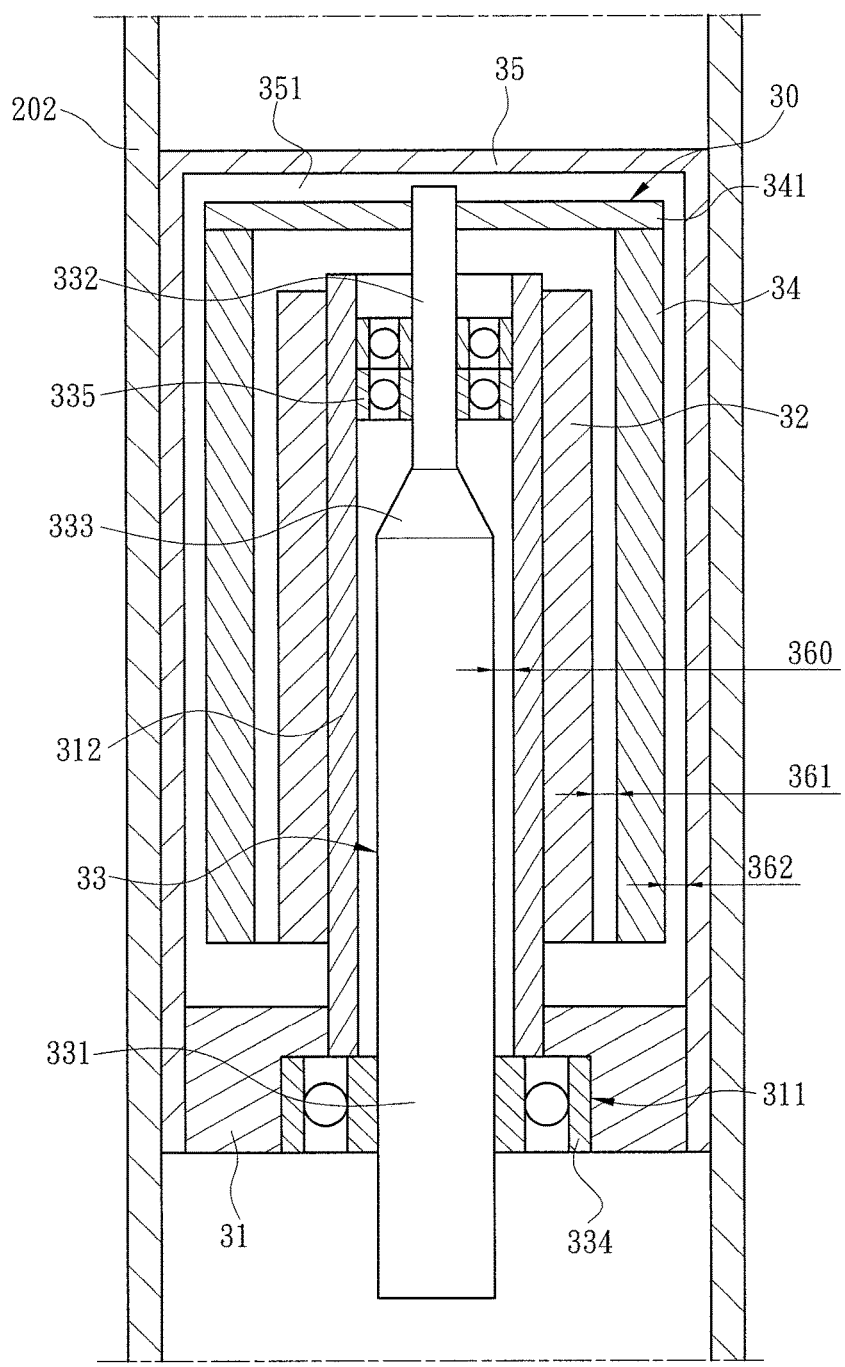
FIG. 7 is a schematic view illustrating the power-driving motor in another embodiment of this invention.

In an embodiment, the power-driving motor 30 may further include a housing 35. The housing 35 has an accommodation space 351. The side plate 31 is provided corresponding to the housing 35 so as to make the stator 32 and rotor 34 to be located in the accommodation space 351. Further, the housing 35 may be the down tube 202 of the bike frame 201, or a standalone member. When the housing 35 is the down tube 202, the side plate 31 of the power-driving motor 30 may be directly fitted into the down tube 202, thereby making the stator 32, the motor spindle 33, and the rotor 34 to be separately located in the down tube 202, as shown in FIG. 6. And, when the housing 35 is a standalone member, the power-driving motor 30 serves as an individual part after being assembled so that the power-driving motor 30 may be fitted into the down tube 202, as shown in FIG. 7, or may be attached onto the bike frame 201. Further, a first clearance 360 is formed between the motor spindle 33 and the mounting holder 312, and a second clearance 361 is formed between the stator 32 and the rotor 34. Further, a third clearance 362 is formed between the rotor 34 and the housing 35.

What is claimed is:

1. A power-driving motor for power-driving bike, comprising:

a housing, of which the length is obviously larger than the width of the housing, the housing being hollow and formed with an accommodation space, the housing being provided with two side plates fitted on the two opposite sides of the accommodation space, and one of the two side plates being provided with a mounting portion communicating with the accommodation space, and with a mounting holder opposite to the mounting portion, wherein the housing is a down tube of a bike frame;

a stator, being provided at a side of the mounting holder facing to the accommodation space;

a motor spindle, passing through the mounting portion and into the accommodation space and being further sleeved around and connected to two bearings fitted separately onto the two side plates; and a rotor, being provided in the accommodation space and including a rotor support connected to the motor spindle, and being provided at the outside of the stator.

2. The power-driving motor for power-driving bike according to claim 1, wherein a clearance is formed between the motor spindle and the mounting holder and a second clearance is formed between the stator and the rotor.

3. The power-driving motor for power-driving bike according to claim 2, wherein a third clearance is formed between the rotor and the housing.

4. A power-driving motor for power-driving bike, comprising:

a side plate, being provided with a mounting portion and a mounting holder opposite to the mounting portion;

a stator, being provided at an outer portion of the mounting holder;

a motor spindle, passing through the mounting portion, in which the motor spindle includes a first section connected to the mounting portion, and a second section stretching from the first section, the diameter of the second section of the spindle is smaller than the first section, and the first section is sleeved around and connected to a first bearing corresponding to the mounting portion and the second section is sleeved around and connected to at least one second bearing provided in the mounting holder; and a rotor, including a rotor support connected to the second section of the motor spindle and being provided at the outside of the stator;

wherein the power-driving motor comprises a housing, which is a down tube of a bike frame and the length of power-driving motor is obviously larger than the width of power-driving motor.

5. The power-driving motor for power-driving bike according to claim 4, wherein the housing includes an accommodation space and the side plate is provided corresponding to the housing so as to make the stator and the rotor to be located in the accommodation space.

6. The power-driving motor for power-driving bike according to claim 5, wherein a clearance is formed between the motor spindle and the mounting holder and a second clearance is formed between the stator and the rotor.

7. The power-driving motor for power-driving bike according to claim 6, wherein a third clearance is formed between the rotor and the housing.

* * * * *